United States Patent [19]
Link et al.

[11] Patent Number: 6,063,841
[45] Date of Patent: May 16, 2000

[54] USE OF SPECIAL VANADIUM COMPOUNDS AS SICCATIVES FOR OXIDATIVELY DRYING LACQUERS

[75] Inventors: Günter Link, Goslar; Dirk Edelmann, Wuppertal; Eberhard Stumpp, Clausthal, all of Germany

[73] Assignee: Borchers GmbH, Monheim, Germany

[21] Appl. No.: 09/054,292

[22] Filed: Apr. 2, 1998

[30] Foreign Application Priority Data

Apr. 10, 1997 [DE] Germany ............ 197 14 825

[51] Int. Cl.⁷ .................. C08K 5/098; C09F 9/00
[52] U.S. Cl. ................ 523/505; 524/102; 524/398; 524/539; 525/360
[58] Field of Search ............ 524/102, 398; 524/539; 523/505, 360

[56] References Cited

U.S. PATENT DOCUMENTS

| | | | |
|---|---|---|---|
| 4,720,352 | 1/1988 | Petronella | 252/308 |
| 5,658,976 | 8/1997 | Carpenter et al. | 524/398 |

FOREIGN PATENT DOCUMENTS

| | | |
|---|---|---|
| 0 304 149 | 2/1989 | European Pat. Off. . |
| 4236697 | 5/1994 | Germany . |
| 123 650 | 2/1968 | Netherlands . |
| 2172598 | 9/1986 | United Kingdom . |

OTHER PUBLICATIONS

Ullmann's Encyclopädie der Chemie, vol. 23, pp. 421–424, (month unavailable) 1979.
Handbook of Coating Additives, Marcel Decker, New York, Basle, (month unavailable) 1988, pp. 501–505.
R. Swethen, Farbenseitung 32 (month unavailable) 1927, pp. 1138–1139.
F. Hebler, Farbenzeitung 32 (month unavailable) 1927, pp. 2077–2078.

*Primary Examiner*—Andrew E. C. Merriam
*Attorney, Agent, or Firm*—Joseph C. Gil; Thomas W. Roy

[57] ABSTRACT

The invention relates to the use of special vanadium compounds as siccatives for oxidatively drying lacquers. These drying agents (siccatives) are ionogenic in nature and contain polyvalent cations of vanadium or vanadium oxide and anionic organic acid groups or other organic anions.

6 Claims, No Drawings

USE OF SPECIAL VANADIUM COMPOUNDS AS SICCATIVES FOR OXIDATIVELY DRYING LACQUERS

The invention relates to the use of special vanadium compounds as siccatives for oxidatively drying lacquers. These drying agents (siccatives) are ionogenic in nature and contain polyvalent cations of vanadium or of vanadium oxide and anionic organic acid groups or other organic anions.

In the context of the invention drying agents are ionogenic metal compounds which are added to unsaturated oils and binders (oxidatively drying components in lacquers) in order to shorten their drying time considerably, i.e. to speed up the transition of a liquid film to the solid phase. This transition takes place by oxidative cross-linking which is accelerated by metallic cations or cation oxides of the ionogenic metal compound.

Drying agents may be present in the solid or dissolved form. In the dissolved form drying agents are also called siccatives.

Traditional drying agents are metal soaps of isooctanoic acid, naphthenoic acid, linoleic fatty acid, castor oil fatty acid or tall oil fatty acid which are prepared by direct reaction of metals and carboxylic acids or, after a precipitation and fusion process, from carboxylic acids and metal oxides or hydroxides. A list of conventional types of drying agents and combinations and methods of preparation may be found for instance in Lehrbuch der Lacke und Beschichtungen vol. III, 1976, pages 296 to 476 or Ulmann's Encyclopädie der Chemie, vol. 23, pages 421 to 424, 1979.

Traditional drying agents are soluble in organic solvents so that they display good drying properties in oxidatively drying lacquers which contain exclusively organic solvents. Thus drying agents according to the prior art are dissolved in generally volatile organic solvents or are prepared directly in organic solvents. Drying agents are known, for example, which are soluble in water or which are present as water dilutable emulsions. Examples of this type of drying agent are the compounds mentioned in patent application DE-A-4 236 697.

In addition to the type of ligand and the type of solvent in drying agents, these may also be differentiated by their drying catalytic properties. Here drying agents which catalyse only auto oxidative cross-linking are called primary dryers, while other drying agents, all of which are used only together with the first mentioned type, are so-called secondary dryers.

Irrespective of the type of solvent and the type of ligands (or anions) found on the metal cations, the following metals may be mentioned as of prime importance: cobalt, lead, manganese, iron, nickel, bismuth, cerium, titanium.

For some time now, intensive efforts have been made to minimise the proportion of organic solvents which are volatile at room temperature in various lacquer systems, that is in oxidatively drying lacquers and also in the siccatives added to them. This is taking place in particular for ecological and toxicological reasons but also for safety reasons when preparing and applying the corresponding lacquers.

One possibility for achieving this requirement is the use of water as a solvent in oxidatively drying lacquer systems.

These systems are characterised by a number of disadvantages when adding conventional siccatives. Thus traditional drying agents such as, for example, octoates are virtually insoluble in water. If they are added, for example, in the form of an emulsion to the binder then hydrolysis of the siccatives often takes place and their reaction products, which are insoluble, settle out. In addition hydrolysis leads to a considerable loss of drying power and to unsatisfactory storage stability of the lacquer formulation. A summary of these phenomena may be found, for instance, in "Handbook of Coating Additives", Marcel Decker, New York, Basle, 1988, pages 501 to 505.

Therefore attempts have recently been made to prepare pre-complexed drying agents which are emulsifiable in water, and which are insensitive towards hydrolysis due to the type of ligand which is present. These types of compounds have been mentioned for instance in the presentation entitled "Neue Additive in Wasselacke" by J. H. Bielemann (22.9.1992 in Nuremburg). These again have the disadvantage that they are very difficult to incorporate into the lacquer. In addition they tend to interact with amines which are possibly present in lacquers, which leads to settling out phenomena often resulting in defective thorough drying of the corresponding lacquer films. In addition the gloss of such lacquer films is reduced by the emulsifier in the drying agent.

One way of counteracting these problems is mentioned in DE-A-4 232 697. There metal soaps are described whose organic anionic groups preferably consist of polyoxycarboxylic acids. These drying agents are preferably based on metal cations of cobalt, lead and zirconium.

Vanadium compounds, in particular vanadium pentoxide and vanadium linoleate, have been described as hardening accelerators for auto-oxidatively drying oils (R. Swethen, Farbenzeitung 32 (1927), pages 1138 to 1139).

In another series of tests, however, these results could not be confirmed (F. Hebler, Farbenzeitung 32 (1927), pages 2077 to 2078). The vanadium siccatives mentioned there were also tested in oils. The common result of both these publications was strong discolouration of the corresponding lacquers and unsatisfactory storage stability of the lacquers to which had been added the vanadium siccatives described there. In addition it should be observed that the precise chemical nature of the drying agents was not described.

The object of the present invention was thus to provide new drying agents for oxidatively drying lacquers which are suitable for systems which contain water as solvent. Accordingly, these drying agents should be soluble in water or able to be incorporated into water without any problem, so that no additional emulsifiers are required. Drying agents according to the invention are also intended not to form disadvantageous hydrolysis products in water and to enable better film qualities for water-containing lacquers than the drying agents known from the prior art.

The invention provides the use of vanadyl salts as siccatives in oxidatively drying lacquers which contain 10 to 80 wt. % of water.

Vanadyl compounds of the formula (I) are preferably used:

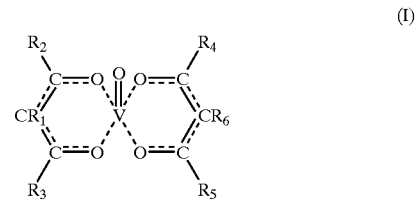

in which

R$_1$ to R$_6$ are identical or different and represent H, CH$_3$, or a C$_2$–C$_{20}$-alkyl, C$_6$–C$_{24}$-aryl or C$_7$–C$_{30}$-aralkyl group.

The following may be mentioned as examples of the compounds of the formula (I): vanadyl-bis-acetylacetonate, vanadyl-bis(benzoylacetonate), vanadyl-bis (dibenzoyacetonate), vanadyl-bis(lauroylacetonate).

According to the invention vanadyl compounds (carboxylates) of the formula (II) are also preferably used

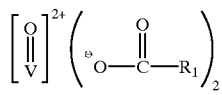

(II)

in which

R$^1$ is defined in the same way as for formula (I) and also comprises vanadyldicarboxylates.

Examples of compounds of the formula (II) are: vanadyl (I)-acetate and vanadyl(II)2-ethylhexanoate and also vanadyl dioxalate and vanadyl dimalonate.

Furthermore vanadyl compounds of the formula (III) are also preferably used

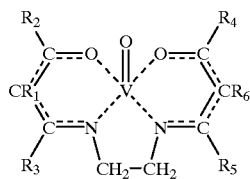

(III)

in which

R$^1$ to R$^6$ are defined in the same way as for formula (I).

Examples of vanadyl compounds of the formula (III) are vanadyl-bis-acetylacetonato-ethylenediimine and vanadyl-bis-benzoylacetonato-ethylenediimine.

Vanadyl phosphates of the formula (IV) and (V) are also preferably used

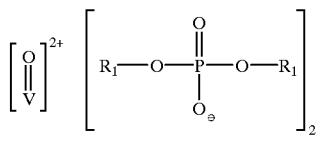

(IV)

and

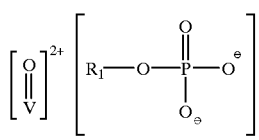

(V)

in which

R$_1$ represents a branched or linear C$_1$–C$_6$-aliphatic group.

Compounds of the general formula (IV) and (V) may be used as a solution in water or as a solution in butanol or similar solvents. Vanadyl phosphates of the formula (IV) and (V) may, as is well known, be present as oligomeric or polymeric substances.

In the context of the invention, vanadyl compounds of the formula (IV) and (V) with R$_1$=n-butyl are preferably used as a solution in n-butanol. Compounds of the general formula (I), (II) and (III) are used in the acid region (pH<5), dissolved in water.

Solutions of vanadyl compounds of the general formulae (I), (II) and (III) which have been adjusted to a pH of 0 to 3 by adding phosphoric acid, hydrochloric acid or sulphuric acid or their acid salts are particularly preferred.

In the context of the invention, the aqueous preparations of vanadyl compounds of the general formula (I), (II) and (III) may also contain up to 30 wt. % of organic, preferably polar, (co)solvents.

The following may be mentioned as examples of substances acting as (co)solvents: aliphatic C$_1$–C$_8$-alcohols, polyhydric alcohols such as e.g. glycol or glycerine, alkoxy alcohols such as e.g. 3-methoxypropanol, 3-ethoxypropanol, 2-butoxyethanol, 4-butoxybutanol etc, acetates of lower alcohols such as e.g. ethyl acetate and butyl acetate, alkoxy esters such as e.g. methoxypropyl acetate, ethoxyethyl acetate or 4-butoxyethyl acetate and polyalkoxyalcohols such as e.g. polyethylene oxide or polypropylene oxide.

Water dilutable preparations of vanadyl compounds of the general formula (I), (II) and (III) may also, in the context of the invention, optionally contain appropriate emulsifiers. The following may be mentioned as examples of such emulsifiers: Borchigen® DFN (Borchers GmbH) and Abex® JKB (Rhône-Poulenc).

Compounds described by the general formulae (I) to (V) may be prepared by processes given in the literature for preparing metal complexes (formulae (I) and (II)) and metal soaps (formula (II)) and phosphates (formulae (IV) and (V)).

Compounds of the general formula (I) to (V) may be present as solids. They can easily be converted into aqueous clear and coloured solutions according to the invention by adding dilute acids, preferably hydrochloric acid.

The invention also provides use of the siccative formulations described above as hardening accelerators for water-dilutable oxidatively drying lacquers.

Siccative preparations according to the invention may be used either on their own or in any mixture with each other. It is also possible in the context of the invention to mix the siccatives according to the invention with conventional drying agents which can be used in water-dilutable oxidatively drying binders or lacquers, or use them together with these in a corresponding lacquer system.

Drying agents or siccatives according to the invention may be used according to the invention in the pure form or, as described above, as aqueous solutions.

The amount of drying agent or siccative to be used depends on the unsaturated character of the binder and on the type of binder used in the lacquers. Other factors which have an effect on the amount to be used are e.g. pigments and the type and amount of antioxidants and other additives such as e.g. wetting agents.

The new siccatives may be added to any water-dilutable, auto-oxidatively drying lacquer or binder.

EXAMPLES

Data given in wt. % refers to the total weight of siccative.

1. Preparation of starting compounds:

17.0 g of concentrated hydrochloric acid are slowly diluted with 47.6 g of water, with stirring. 17.0 g of vanadyl-bis-acetylacetonate are added to this solution. A clear blue solution with a metal content of 4.0 wt. % is obtained.

2. Application examples (application)

a) Drying a lacquer based on the binder Uradil AZ 554 Z® 50:

The following commercially available lacquer with the composition given below was dried:

51.7% Uradil AZ 554 Z 50 (50% strength aqueous emulsion of an alkyd resin; from the DSM Co.: Netherlands)
18.95% water
3.60% Borchirgel LW 44® (PUR thickener)
0.10% TEGO-Foamex KS 10® (mineral oil defoaming agent)
23.40% titanium dioxide R-HD 2®
2.00% Borchigen SN 95® (basic crosslinkable PUR)

The siccative described in example 1 was added to this parent batch and applied as a 100 μm wet film. The drying time (drying recorder, tack free) and the pendulum hardness (König) of these films were determined. The following results were obtained:

| Sample No. | Amount of siccative added | Drying time | Pendulum hardness after |||
|---|---|---|---|---|---|
| | | | 24 h | 48 h | 72 h |
| 1 | 1.25% | 1.5 h | 19 s | 34 s | 37 s |
| 2 | 0.65% | 2.0 h | 22 s | 34 s | 38 s | b) Drying a lacquer based on Plusaqua P 581 PW® (50% aqueous emulsion of alkyl resin, emulsified in water, Stauffer CH).

A parent batch was prepared as explained under (a) which had the same composition as given in (a) but the binder was exchanged 1:1 for the binder mentioned above. The application and test methods were unchanged. The following results were obtained:

| Sample No. | Amount of siccative added wt. % of solution | Drying time | Pendulum hardness after |||
|---|---|---|---|---|---|
| | | | 24 h | 48 h | 72 h |
| 3 | 1.25% | 1.0 h | 25 s | 30 s | 32 s |
| 4 | 0.65% | 1.5 h | 22 s | 27 s | 30 s |

The pendulum hardness was determined in accordance with DIN . . .

What is claimed is:

1. A composition containing an oxidatively drying lacquer, 10 to 80% of water, based on the weight of the composition, and a siccative comprising a vanadyl salt corresponding to formula I (I)

wherein
$R_1$ to $R_6$ independently of each other represent H, $CH_3$, a $C_2$–$C_{20}$-alkyl group, a $C_6$–$C_{24}$-aryl group or a $C_7$–$C_{30}$-aralkyl group, corresponding to formula II (II)

wherein
$R_1$ represents a $C_1$–$C_{20}$-n-alkyl group, a branched $C_3$–$C_{20}$ alkyl group or a $C_6$–$C_{24}$-aryl group, corresponding to formula III (III)

wherein
$R_1$ to $R_6$ independently of each other represent H, $CH_3$, a $C_2$–$C_{20}$-alkyl group, a $C_6$–$C_{24}$-aryl group or a $C_7$–$C_{30}$-aralkyl group, or corresponding to formula IV or V (IV)

(V)

wherein
$R_1$ is a linear or branched $C_1$–$C_6$, alkyl group.

2. The composition of claim 1 wherein said vanadyl salt comprises a salt corresponding to formula I.

3. The composition of claim 1 wherein said vanadyl salt comprises a salt corresponding to formula II.

4. The composition of claim 1 wherein said vanadyl salt comprises a salt corresponding to formula III.

5. The composition of claim 1 wherein said vanadyl salt comprises a salt corresponding to formula IV or V.

6. The composition of claim 1 wherein said vanadyl salt comprises vanadyl dioxalate and/or vanadyl dimalonate.

* * * * *